United States Patent [19]
Keith et al.

[11] Patent Number: 5,606,832
[45] Date of Patent: Mar. 4, 1997

[54] CONNECTORS USED IN MAKING HIGHLY INSULATED COMPOSITE WALL STRUCTURES

[75] Inventors: David O. Keith; David M. Hansen, both of American Fork, Utah

[73] Assignee: H. K. Composites, Inc., Orem, Utah

[21] Appl. No.: 645,000

[22] Filed: May 15, 1996

Related U.S. Application Data

[63] Continuation-in-part of Ser. No. 558,734, Nov. 16, 1995, and Ser. No. 225,910, Apr. 8, 1994, Pat. No. 5,519,973.

[51] Int. Cl.$^6$ .................................. E04B 1/62; E04B 5/00
[52] U.S. Cl. ..................... 52/410; 52/309.7; 52/309.11; 52/511; 411/387; 411/487; 411/439
[58] Field of Search .................................. 52/410, 309.7, 52/309.1, 309.11, 309.12, 511, 512, 513, 514, 713; 441/387, 487, 482, 439

[56] References Cited

U.S. PATENT DOCUMENTS

| | | | |
|---|---|---|---|
| 2,412,744 | 12/1946 | Nelson | 72/16 |
| 2,575,079 | 11/1951 | Temple | 85/28 |
| 2,595,123 | 4/1952 | Callan | 25/154 |
| 2,645,929 | 7/1953 | Jones | 72/103 |
| 2,653,469 | 9/1953 | Callan | 72/50 |
| 2,718,138 | 9/1955 | Jones | 72/48 |
| 2,769,333 | 11/1956 | Reintjes | 72/19 |
| 2,775,018 | 12/1956 | McLaughlin | 25/131 |
| 2,964,821 | 12/1960 | Meehan | 25/131 |
| 3,000,144 | 9/1961 | Kitson | 50/268 |
| 3,131,514 | 5/1964 | Siek | 50/272 |
| 3,208,328 | 9/1965 | Myers | 85/1 |
| 3,304,676 | 2/1967 | Sallie et al. | 52/276 |
| 3,426,494 | 2/1969 | Hala | 52/410 |
| 3,523,359 | 8/1970 | Rutter et al. | 52/410 |
| 3,646,715 | 3/1972 | Pope | 52/309 |
| 3,701,228 | 10/1972 | Taylor | 52/309 |

(List continued on next page.)

OTHER PUBLICATIONS

R. Layne, *Concrete–Plastic Sandwich Forms Walls Fast,* Popular Science, p. 1 (Sep. 1985).
*Sandwich Wall panels for Expanded Corporate Offices and Warehouse,* CI Journal, pp. 148–152 (Jul.–Aug. 1979).
W. E. Yates, *Lightweight Cladding Cuts Costs at Worthing,* Concrete, pp. 12–13 (Dec. 1979).
P. Juhnke, *Tilt–Up Panels, Possible Key to Low–Cost Concrete Houses,* Concrete Construction, vol. 15, No. 5, pp. 156–157 (May 1970).
Composite Technologies Corporation product brochure for "Thermomass Building System" (1990).
Composite Technologies Corporation product brochure for "Thermomass Building System" (date unknown).
Preco Precast Division product brochure for "Fosroc®" (date unknown).

*Primary Examiner*—Carl D. Friedman
*Assistant Examiner*—Winnie Yip
*Attorney, Agent, or Firm*—Workman, Nydegger & Seeley

[57] ABSTRACT

Highly insulating connectors used in making highly insulative composite wall structures. At least a substantial portion of the connector is injection molded in a single step from an appropriate resinous material or moldable plastic. The connector has a substantially pointed end in a penetrating segment for facilitating penetration of the connector through an insulating layer and a yet unhardened structural material, such as concrete, that will harden into a first structural layer. The opposite end, or gripping segment, includes arcuate wings for facilitating gripping of the connector during placement in the insulating layer and first unhardened structural layer, and also for anchoring the connectors upon hardening of a second structural layer. A middle or mesial segment resides within the insulating layer, which is sandwiched between the first and second structural layer. The arcuate wings are curved toward the penetrating end and terminate in an elongated surface to limit the depth of penetration of the connector when inserted through the insulating material. An optional enlarged head at the end of the gripping segment can receive an impact, such as by a hammer or mallet, or serve to more comfortably receive pressure from the palm of the hand during placement of the connector.

20 Claims, 4 Drawing Sheets

U.S. PATENT DOCUMENTS

| | | | |
|---|---|---|---|
| 3,750,355 | 8/1973 | Blum | 52/309 |
| 3,869,219 | 3/1975 | Wilson et al. | 403/282 |
| 3,879,908 | 4/1975 | Weismann | 52/309 |
| 4,018,023 | 4/1977 | Anderson | 52/410 |
| 4,157,001 | 6/1979 | Pickles | 52/506 |
| 4,329,821 | 5/1982 | Long et al. | 52/309.12 |
| 4,348,847 | 9/1982 | Jukes | 52/426 |
| 4,393,635 | 7/1983 | Long | 52/309.11 |
| 4,545,163 | 10/1985 | Asselin | 52/378 |
| 4,624,089 | 11/1986 | Dunker | 52/410 |
| 4,702,053 | 10/1987 | Hibbard | 52/309.7 |
| 4,829,733 | 5/1989 | Long | 52/309.11 |
| 4,907,928 | 3/1990 | Beck et al. | 411/307 |
| 4,932,819 | 6/1990 | Almeras | 411/441 |
| 4,945,700 | 8/1990 | Powell | 52/514 |
| 4,948,312 | 8/1990 | Jochum | 411/5 |
| 4,973,211 | 11/1990 | Potacek | 411/452 |
| 5,011,354 | 4/1991 | Brownlee | 411/439 |
| 5,031,378 | 7/1991 | Murphy | 52/747 |
| 5,094,057 | 3/1992 | Morris | 52/511 |
| 5,265,998 | 11/1993 | Kluser | 411/480 |

CONNECTORS USED IN MAKING HIGHLY INSULATED COMPOSITE WALL STRUCTURES

RELATED APPLICATIONS

This application is a continuation-in-part of copending U.S. application Ser. No. 08/558,734, filed Nov. 16, 1995, in the names of David O. Keith and David M. Hansen for "Insulating Connector Rods Used in Making Highly Insulated Composite Wall Structures" and a continuation-in-part of copending U.S. application Ser. No. 08/225,910, filed Apr. 8, 1994, in the names of David O. Keith and David M. Hansen for "Highly Insulative Connector Rods and Methods for Their Manufacture and Use in Highly Insulated Composite Walls," issued May 28, 1996 as U.S. Pat. No. 5,519,973. For purposes of disclosure, the foregoing U.S. patent applications are incorporated herein by specific reference.

BACKGROUND OF THE INVENTION

1. Field of the Invention

This invention relates to highly insulative connectors used to secure together multiple layers of insulating and structural material within a composite wall structure. In particular, the inventive connectors secure together an insulating layer and preferably two structural layers on either side of the insulating layer. The connector rods are especially suited for construction of composite wall structures using the "tilt-up" method.

2. The Relevant Technology

As new materials and compositions have been continuously developed, novel methods for synergistically combining apparently unrelated materials to form useful composites have also been deployed. In the area of building and construction, high strength structural walls have been fabricated and then coated or layered with highly insulative materials, which generally have relatively low structural strength, to provide a composite structure having both high strength and high insulation. Conventionally, the structural component, such as a wall, is built first, after which the insulating layer or sheet is attached to the structural component. Thereafter a protective cover is placed over the insulating material to protect and hide it. The purpose of the insulation barrier is to impede the transfer of thermal energy across the structural wall.

One of the least expensive and strongest building materials that has found extensive use in the construction industry is concrete, which is typically formed from a mixture of hydraulic cement, water, and an aggregate, including rocks, pebbles and sand. Unfortunately, concrete has the drawback of offering relatively poor insulation compared to highly insulating materials such as fiberglass or polymeric foam materials. While an 8 inch slab of concrete has an R value (or thermal resistance) of 0.64, a 1 inch panel of polystyrene foam has an R value of 5.0. Conversely, highly insulative materials, at least those of reasonable cost, typically offer little in terms of structural strength or integrity. Though lightweight aggregates having higher insulating ability may be incorporated within concrete to increase the insulating effect of the concrete, the use of perlite in an amount that has a dramatic effect on the insulation ability of the concrete will usually result in greatly decreased strength of the resulting structure.

While structural walls made of cement or masonry can be fitted or retrofitted with any number of insulating materials, including insulating mats or sheets that are attached to the inner wall, or foams that are sprayed between an inner and outer wall, one strategy has been to manufacture a composite wall structure having two structural layers separated by a core insulating layer. However, in order for the two-structural-layer wall to have sufficient strength and integrity, and to prevent the two structural walls from collapsing together or separating apart during construction and subsequent use of the building, it is necessary to structurally bridge the two structural walls together. This has usually been accomplished through the use of metal studs, bolts, or beams.

However, because metal is very conductive (i.e., has very low thermal resistance), such studs, bolts, beams, or other means for structurally bridging the two walls together can also create a heat conduit or conductive thermal bridge across which heat can readily flow, notwithstanding their being surrounded by ample amounts of an insulating material. As a result, heat can rapidly flow from a relatively warm inside wall to a colder outside wall during cold weather, for example. Therefore, though the structural walls might be separated by a very efficient insulating material having a high R value (which is the measure of the resistance to flow of thermal energy, or heat, across the material), the net R value of the overall composite structure will often be far less when metal or other noninsulating connectors are used, thus negating or at least greatly diminishing the effect of the insulation layer. Of course, one might construct a building having no structural supports or connectors between the inner and outer walls; however, the result will be a wall having inadequate strength for most building needs.

Examples of composite wall structures using metal tie rods or studs may be found in the following U.S. patents: U.S. Pat. No. 4,393,635 to Long, U.S. Pat. No. 4,329,821 to Long et al., U.S. Pat. No. 2,775,018 to McLaughlin, U.S. Pat. No. 2,645,929 to Jones, and U.S. Pat. No. 2,412,744 to Nelson. As stated above, the composite wall structures disclosed in these references have a substantially lower R value than that of the highly insulating layer due to the thermal bridging effect of the highly conductive metal studs or connectors that pass through the cross section of the insulating layer.

In order to minimize the problem of thermal bridging, some have employed connector rods having a metal portion that passes through the concrete layers and a thermally insulating portion that passes through the insulating layer (e.g., U.S. Pat. No. 4,545,163 to Asselin). Others have developed connector rods made entirely from high R-value materials. For example, U.S. Pat. No. 4,829,733 to Long (hereinafter the "Long '733 Patent") discloses a plastic shear connector used in forming an insulated wall having an inner and an outer concrete structural layer, with a highly insulating layer sandwiched therebetween. Although the plastic shear connector described in the Long '733 Patent has found some use in the construction industry, the design of the connector described therein, together with the method for making such a connector, create added materials, manufacturing, and labor costs due to the relatively inefficient method of forming and then using the connector set forth in the Long '733 Patent. A summary of the method used to manufacture the preferred connector rods disclosed in the Long '733 Patent, as well as a summary of the limitations in their use and effectiveness, are set forth in copending U.S. application Ser. No. 08/255,910, filed Apr. 8, 1994, and issued as U.S. Pat. No. 5,519,973 (hereinafter the "'973 Patent"), which has been incorporated by specific reference for disclosure purposes.

One method for manufacturing the composite wall structure described herein is the so-called "tilt-up" method, whose manufacture is described hereinbelow. Examples of useful connector rods used in the tilt-up method may be found in the '973 Patent, which connectors have a substantially pointed tip at one end and an enlarged head at the other. Both aid in the placement of the connector rods compared to, e.g., the connector disclosed in the Long '733 Patent. The tilt-up method for manufacturing composite wall structures is typically carried out as follows.

First, concrete is poured into a horizontally configured form to form a first unhardened structural layer. Second, the insulating layer is placed over the surface of the still uncured first structural layer. Third, the connector rods are inserted through the exposed horizontal surface of the insulating layer so that a first portion of the connector rods extends into the interior of the uncured first structural layer, so that a second portion spans the width of the insulating layer, and so that a third portion extends outwardly from the insulating layer surface. The connector rods are preferably twisted in order to consolidate the uncured concrete into a locking structure or recess within the first portion of the connector rod to ensure eventual secure anchoring of the connector rod within the first horizontal slab. Fourth, either before or after substantial hardening of the first structural layer, a second concrete layer is poured over the surface of the insulating layer within a form in order to form the second structural layer. The third portion of the connector rods is preferably fully enveloped within the second structural layer. Fifth, after the first and second structural layers have been adequately cured and the forms removed, the horizontally positioned composite wall structure is tilted up vertically by means of a hoist or crane and positioned into the desired location.

A second method for manufacturing the composite wall structure is the "cast-in-place" method, wherein the structural walls are poured within a vertical form that has been built in a location at or near where the composite wall structure is to be finally located. In the cast-in-place method, connector rods having a length corresponding to the width of the entire composite wall structure are placed substantially orthoginally through the insulating layer, with a first portion extending out of one surface of the insulating layer, a second portion extending through the width of the insulating layer, and a third portion extending out the other surface of the insulating layer.

The insulating layer with the connector rods extending out of both surfaces is then placed parallel to and between the walls of the form. The extended portions of the connector rods horizontally span the form and maintain the insulating layer in a properly spaced arrangement between the two walls of the form, with vertical spaces between each side of the insulating layer and the form walls where the structural material is to be poured. Thereafter, concrete or other hardenable structural material is poured within each of the two vertical spaces to form a structural layer on either side of the insulating layer. Upon curing and removal of the form, the structural layers and insulating layer are locked together by means of the connector rods to form the composite wall structure. Examples of connector rods used in the cast-in-place method may be found in U.S. application Ser. No. 08/558,734 referenced above (hereinafter the "'734 Application").

In light of the foregoing, what are needed are improved insulating connectors and methods for manufacturing highly insulative composite wall structures.

In addition, what are needed are improved designs and methods for molding improved insulating connectors in a single step that yet provide adequate strength and support in the manufacture of composite wall structures.

Additionally, it would be an improvement in the art to provide improved connectors that can be molded in a single step and yet provide means for anchoring the connectors within the concrete layers while also providing means for positioning the connectors within the insulating layer during the formation of the composite wall structure.

In addition, it would be an improvement in the art to provide connectors that can be integrally molded in one step without the need to separately mold an elongate connector shaft having means for retaining the shaft within the outer structural layers and a central sleeve portion having a flange and an enlarged central diameter for positioning the connector within the insulating layer.

It would be a further improvement in the art to provide improved connectors having means for facilitating their penetration through an insulating layer and a first of two structural layers during the formation of a composite wall structure, particularly using the tilt-up method.

Finally, it would be a tremendous advancement in the art to provide improved connectors having means for receiving an impact, such as from a hammer or a mallet and/or features which aid in gripping the connector in order to facilitate penetration of the connectors through the insulating layer and the first structural layer. Such improved connectors having improved design features and methods for manufacturing such connectors having the aforesaid design features are set forth and claimed herein.

SUMMARY OF THE INVENTION

The present invention relates to improved designs and methods for manufacturing connectors used in the manufacture of composite wall structures. In particular, such connectors can be manufactured, at least substantially, in a single step and may be used in the manufacture of highly insulating wall structures having two concrete structural layers surrounding a highly insulating material sandwiched therebetween. Such composite wall connectors prevent or greatly reduce the flow of heat between the two concrete walls surrounding the insulative material. In addition, the connectors of the present invention include design features which greatly facilitate their placement through the insulating layer and the first structural layer during the initial stages of forming the wall structure. They preferably include structural features which make them easier to grip by the technician during placement and may optionally include means for receiving an impact, such as by a hammer or mallet.

These features have been accomplished by designing and manufacturing connectors having a substantially pointed tip one at end and gripping means at the opposite end. Such connectors are generally symmetrical and/or simple in design and construct, which allows them to be molded in a single step, such as by injection molding, resin transfer molding, or reaction injection molding, thereby eliminating the need to form the connectors in a multi-step fashion as has been the standard in the art for plastic connectors similar in design and construct to those disclosed in the Long '733 Patent.

In a preferred embodiment, the connector rod is injection molded from a polyphthalimide resin or other high strength resin or moldable plastic material. Another preferred material is a polycarbonate "alloy" consisting of polycarbonate and polybutylene teraphthalate. In some cases, where increased tensile and flexural strength are desired, fibers such as glass fibers, graphite fibers, mineral fibers, boron fibers, ceramic fibers, and the like may be impregnated within the resin to form connectors having increased strength and stiffness. The use of more flexible fibers, such as cellulosic, nylon, or other polymeric fibers would be expected to increase the toughness and decrease the brittleness of the connectors. Nevertheless, where fibers are unnecessary it will be preferable to not use them due to the generally increased cost of their use.

In a preferred embodiment, the inventive connectors include a central shaft having at one end a substantially pointed tip, which facilitates penetration of the connectors through the insulating layer and the first structural layer while the latter is still in a plastic and deformable state before substantial hardening has occurred. At the opposite end of the central shaft is a gripping feature comprising one or more curved flanges or arcuate wings emanating from the end of the connector. The combination of having a pointed tip at one end of the connector coupled with a gripping feature at the opposite end greatly facilitates the use of the connectors in the manufacture of composite wall structures using the tilt-up method, which would be expected to reduce the time and cost of manufacturing composite wall structures. Of course, the connectors disclosed and claimed herein are not limited to any particular method and may be used, for example, in both the tilt-up and cast-in-lace methods of manufacturing composite wall structures (although a connector having pointed tips at both ends, as in the '734 Application, is preferred for the cast-in-place method).

The central shift includes a middle portion, or "mesial segment", which is intended to reside within the insulating layer. The mesial segment is preferably designed to greatly reduce or prevent the incursion of concrete or other flowable structural material around the mesial segment and into the interior of the volume defined by the insulating layer. Such an influx of concrete into the insulating layer could create a thermal bridge through that portion of the insulating layer, which would reduce the overall insulating ability, or R-value, of the composite wall structure.

For purposes of clarity, the segment of the connector that includes the pointed tip that penetrates the insulating layer will hereinafter be referred to as the "penetrating segment", while the remaining segment (besides the mesial and penetrating segments) that includes the gripping feature and that does not substantially penetrate the insulating layer will be referred to as the "gripping segment".

The substantially pointed end within the penetrating segment of the connectors of the present invention makes it far quicker and easier for the technician to insert the connector rods through the insulation layer and first unhardened structural layer compared to, e.g., connectors having a rectangular cross-section on both ends, which design is commonly used in the industry. In addition, the substantially pointed end allows for easy penetration through an insulating material that has a greatly reduced hole size drilled therethrough, or even none at all, since the substantially pointed end makes the connector rod "self-tapping". In a simple design, the pointed end could simply comprise a cone-shaped tip. Alternatively, the end could have a pyramidal (3-, 4-, or multi-faceted) shape rather than a conical tip and still fall within the definition of "substantially pointed". The result would be substantially the same in each case. A wedge-shaped or "chisel" end, which closes up to a line rather than a single point, would be less satisfactory, but superior to the rectangular surface of the prior art connectors.

The connectors further include one or more recessed portions in the penetrating segment into which unhardened concrete or other structural material will flow during placement of the connectors through the insulating layer and first structural layer. Upon hardening, the concrete or other structural material within the one or more recessed portions will firmly and reliably anchor the penetrating segment of the connectors firmly within the first structural layer of the composite wall structure. Twisting the connectors can help consolidate the concrete or other structural material within the one or more recessed portions.

The mesial segment includes no special design features but merely defines that segment of the central shaft which resides within the insulating layer. There is generally no visible demarcation which readily separates the mesial segment from either the penetrating segment or the gripping segment, although the gripping segment will include orienting means for limiting the penetration of the connectors through the insulating layer, which orienting means will more or less define a plane that bisects the intersection between the mesial segment and the gripping segment of the central shaft.

The gripping segment is defined as the portion of the connector which is intended to be gripped or held by the technician during placement of the connectors through the insulating layer and the first structural layer. Because the gripping segment does not substantially penetrate the insulating layer, it will eventually be covered over or enveloped within the second structural layer.

The gripping segment includes one or more flanges or wings of a generally curved or arcuate nature which facilitate gripping by the technician. In general, it is preferable for the gripping segment to include two arcuate wings which emanate from the end of the connector rod distal to the substantially pointed tip and which curl around back towards the penetrating tip and terminate in a generally flat or enlarged end for limiting the depth of penetration of the connector during placement. The flat ends of the curved wings or flanges will normally abut the outer surface of the insulating layer intended to come in contact with the second structural layer. In addition, the generally curved wings or flanges provide reliable anchoring means for anchoring the gripping segment within the second structural layer upon hardening or curing of the second structural layer. In light of the foregoing, the gripping segment provides at least three functions: (1) it facilitates gripping or handling by the technician, (2) it includes means for limiting the penetration of the connector or connectors through the insulating layer, and (3) it provides means for anchoring the connector within the hardened structural layer.

From the foregoing, it is an object of the present invention to provide improved insulating connectors and methods for manufacturing highly insulative composite wall structures.

A further object and feature of the present invention is to provide improved designs and methods for molding improved insulating connectors in a single step that yet provide adequate strength and support in the manufacture of composite wall structures.

Yet another object and feature of the present invention is to provide improved connectors that can be molded in the single step and yet provide means for anchoring the connectors within the concrete layers while also providing means for positioning the connectors within the insulating layer during the formation of the composite wall structure.

An additional object and feature of the present invention is to provide connectors that can be integrally molded in a single step without the need to separately mold an elongate connector shaft having means for retaining the shaft within the outer structural layers and a central sleeve portion having a flange and an enlarged central diameter for positioning the connector within the central layer.

A further object of the present invention is to provide improved connectors having means for facilitating their penetration through an insulating layer and a first of two structural layers during formation of a composite wall structure, particularly using the tilt-up method.

A further object and feature of the present invention is to provide improved connectors having means for receiving an impact, such as from a hammer or a mallet and/or features which aid in gripping the connector in order to facilitate penetration of the connectors through the insulating layer and the first structural layer.

These and other objects and features of the present invention will become more fully apparent from the following description and appended claims, or may be learned from the practice of the invention as set forth hereinafter.

DETAILED DESCRIPTION OF THE PREFERRED EMBODIMENTS

Figure 1:
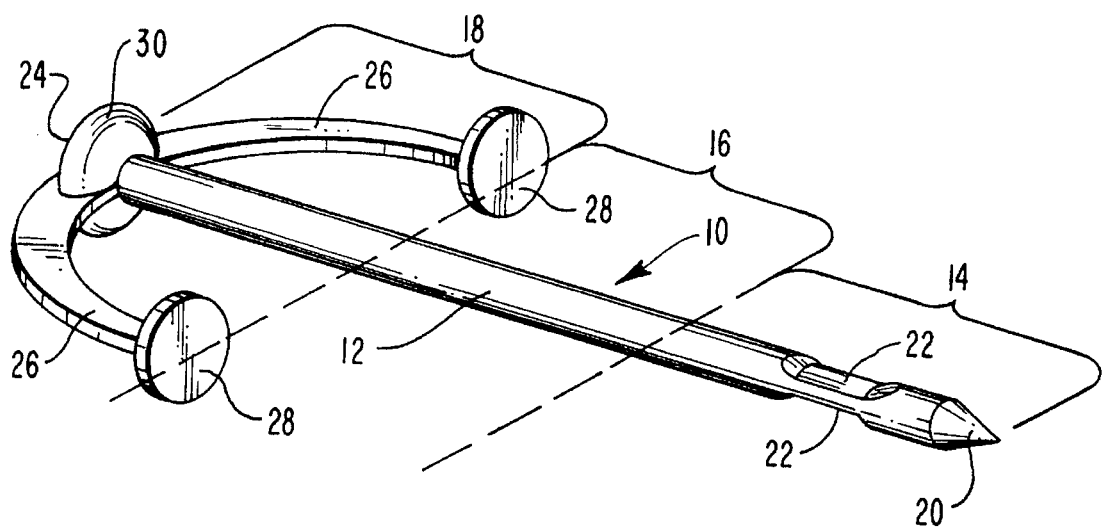
FIG. 1 is a perspective view of a preferred insulating connector.

The present invention relates to specially designed, highly insulative connectors used in the manufacture of composite wall structures, and methods for the manufacture and use of such connectors. Such connectors can be manufactured in a single step to yield connectors having a wide variety of structural features and accessories therein. Such connectors are designed to secure together two structural layers that are separated a predetermined distance by an insulating layer therebetween comprising a highly insulating, or high R value, material. Because the connectors also are made from a high R value material, they prevent or greatly reduce the flow of heat between the two concrete walls or other structural layers compared to, e.g., metal connectors. The design of the connectors makes them especially useful in the manufacture of composite wall structures using the tilt-up method. However, they are not limited to any particular method of use for manufacturing composite wall structures.

The connectors of the present invention are preferably injection molded from any appropriate resin or other high strength plastic material, although they may also be molded by resin transfer molding, reaction injection molding, or any other single-step or relatively simple molding process known in the art (such as pull-trusion followed by reform-ing). An important criterion is that the manufacturing costs of the molding process be commensurate with the overall cost parameters of the connector to be used.

The connectors of the present invention can be molded from a variety of thermoplastic and thermoset materials. Preferred thermoplastic resins include polyamide (nylon), polyarylsulfone, polycarbonate (PC), polyphthalamide (PPA), and polysulfone (PSF). Less preferred thermoplastics that are nevertheless adequate for most applications include acrylics, acrylonitrile-butadiene-styrene copolymer (ABS), fluorocarbons, polybutadiene, polybutylene teraphthalate (PBT), polyesters, polyethylene teraphthalate (PET), polyphenylene ether, polyphenylene oxide (PPO), polyphenylene sulfide (PPS), polyphthalate carbonate, polypropylene, polystyrene, polyurethane, polyvinyl chloride, and polyxylene.

Some of the thermoplastic resins can advantageously be used together as "allows". A preferred thermoplastic alloy is PPO/Nylon. Other thermoplastic alloys include ABS/PC, PBT/PET, PC/PBT, PC/PET, and PS/PC.

Preferred thermoset resins include polyester and vinyl ester. Other thermoset resins include diallyl phthalate (DAP), epoxy resins, furan resins, and phenolic resins. The foregoing lists are illustrative but not limiting. The only criteria is that the type of material that is used have sufficient strength to avoid failure during the intended use of the connectors and have a sufficiently high R value such that the connector does not create an unduly conductive thermal bridge or conduit through the insulating barrier. Even low density ceramics having low specific heat and high insulation could be used. An important criterion is to select a resinous material or other plastic having the desired properties of strength and insulation depending on the performance criteria of the composite wall structure to be fabricated.

Although not necessary in many instances, it may be desirable to incorporate within the resinous material or other plastic material fibers such as glass fibers, graphite fibers, boron fibers, ceramic fibers, and the like in order to increase the tensile strength, bending strength, and toughness of the connector. Fibers can also increase the shear strength of the o connector if adequately randomly dispersed throughout the resinous or other plastic material. Nevertheless, where fibers are not necessary in order to impart greater strength or stiffness to the connector, it will usually be preferable to exclude them due to the generally increased cost of their use.

Because the use of resins or other moldable plastics (whether or not impregnated with fibers) allows for an almost endless variety of design configurations that can be molded into a connector in a single step, such connectors can include a wide variety of structural features or accessories without increasing the cost of manufacture. Many connectors presently used in making composite wall structures are formed by pull-truding continuous fibers through a resinous material, which thereafter must be cut, machined, and then retrofitted with even the most minor additional structural features due to the limitations inherent in the pull-trusion method of molding. Pull-trusion, like extrusion, is inherently only capable of yielding rods of uniform cross-section corresponding to the die head design. Nevertheless, the simplicity of design of the connectors of the present invention might make pull-trusion economically feasible for certain designs and applications.

Referring to FIG. 1, in a first preferred design of a connector according to the present invention, the connector 10 includes an elongate shaft 12 that is preferably cylindrical or ellipsoidal. Nevertheless, the elongate shaft 12 can have any generally regular cross-section such as square, rectangle, triangle, pentagon, hexagon, cruciform, and the like. The elongate shaft 12 includes a penetrating segment 14, a mesial segment 16, and a gripping segment 18. The boundaries between the penetrating segment 14, mesial segment 16, are designated by the broken lines shown in FIG. 1. The locations of the broken lines are only approximate. The exact boundaries will be determined by the thickness of the insulating layer and the method of placement of the connectors. The boundaries between the penetrating segment 14, the mesial segment 16, and the gripping segment 18 correspond to the planes defined by the interfaces between the first structural layer, insulating layer, and second structural layer, respectively.

The penetrating segment 14 includes a substantially pointed penetrating tip 20 disposed at a first end of the connector 10. Although the penetrating tip 20 has a generally conical shape as shown in FIG. 1, it can be of any shape so long as it generally ends in a tip having a substantially reduced diameter relative to the diameter of the elongate shaft 12. For example, the penetrating tip 20 can have a chisel-shaped or even a rounded tip. The only limiting criteria is that the penetrating tip have a substantially reduced cross-sectional diameter at the tip relative to the diameter of the elongate shaft 12. The penetrating tip 20 facilitates entry of the connector 10 through an insulating layer and a fresh first layer of fresh, unhardened structural material, as set forth more fully below.

In addition, the penetrating segment 14 includes at least one recessed portion 22 disposed between the penetrating tip 20 and the intersection or boundary between the penetrating segment 14. As set forth more fully below, the penetrating segment 14 is intended to substantially penetrate and be anchored within a first structural layer. The one or more recessed portions 22 are designed for receiving flowable or plastic concrete or other hardenable structural material therein for anchoring the connector within the first structural layer upon curing or hardening of the structural material.

Further up the elongate shaft 12 is the mesial segment 16, which is generally of uniform shape, and may be cylindrical or may have a cross section of, e.g., a square, rectangle, triangle, pentagon or any other generally uniform cross section. The mesial segment 16 generally includes no structural features and is intended to occupy, in a close-fitting manner, a hole drilled within the insulating layer. Alternatively, the hole in the insulating layer can be formed by the penetrating tip 20, which can be "self-tapping" in many instances. By definition, the length of the mesial segment 16 is generally defined by the thickness of the insulating layer. If the connector 10 is placed orthogonally relative to an insulating layer of uniform thickness, the length of the mesial segment 16 will generally be equivalent to the thickness of the insulating layer. Nevertheless, the boundaries of the mesial segment 16 can vary where the connector 10 is placed at an angle different than orthogonal, or where the insulating layer has varying cross-sectional thicknesses.

Further up the elongate shaft 12 is the gripping segment 18, which begins at the interface between the mesial segment 16 and the gripping segment 18 and terminates at an end 24 of the elongate shaft 12 opposite the penetrating tip 20. The gripping segment 18 preferably includes a pair of oppositely disposed arcuate wings 26, which emanate from the elongate shaft 12 somewhere within the gripping segment 18. Preferably, the arcuate wings 26 will protrude at or near the end 24 of the gripping segment 18. The arcuate wings 26 arc or wrap around towards the penetrating segment 14 and provide comfortable and reliable means for gripping the connector 10 during placement of the connector 10 through an insulating layer and the first structural layer.

Each of the arcuate wings 26 curl around and terminate as flat ends 28 that are intended to abut a surface of the insulating layer in order to limit penetration of the connector 10 through the insulating layer. The flat ends 28 are preferably enlarged as shown in FIG. 1 in order to provide reliable means for limiting penetration of the elongate shaft 12 of the connector 10 through the insulating layer during placement and to prevent penetration of the arcuate wings 26 themselves into the insulating layer. Nevertheless, one might, in an alternative embodiment, intend for at least a portion of the arcuate wings 26 to penetrate the insulating layer. In this case, the arcuate wings 26 can include a flange or stop (not shown) somewhere up from the ends of the wings 26.

The arcuate wings 26 also function to provide means for anchoring the gripping segment 18 within the second structural layer upon hardening. The structural material while in a plastic and flowable state, flows into the spaces between the arcuate wings 26, the elongate shaft 12, and the insulating layer. Thereafter, as the structural material hardens the arcuate wings 26 prevent the gripping segment 18 from moving in any direction within the hardened structural layer. The end 24 of the gripping segment 18 may or may not include an enlarged head that provides means for receiving an impact or striking force such as from, e.g., a hammer or mallet. The connector 10 depicted in FIG. 1 includes a generally circular enlarged head 30 that provides means for receiving an impact such as from a mallet or hammer. In addition, it provides a larger surface against which the palm of the technician's hand can press while gripping the connector 10 during placement.

Because of the ease in which the connectors of the present invention may be injection molded, the penetrating tip 20, the recessed portions 22, the arcuate wings 26, and the flat ends 28 can be quickly and easily formed within the connector 10 in a single molding step. Nevertheless, one may wish to incorporate one or more structural features or accessories into the connectors using one or more separate molding or forming steps. In addition, a freshly molded connector may, if desired, be structurally altered such as by curving or bending the connector while still in an unhardened condition.

The connectors of FIGS. 2–5 function in a similar manner compared to the connector of FIG. 1, except that they have a slightly different shape for a different look feel, and function of the connector. For example, the connector of FIG. 2 includes arcuate wings 26 that have a different arc compared to the arcuate wings 26 of the connector in FIG. 1. Moreover, the flat ends 28 are generally oval rather than circular.

Figure 2:
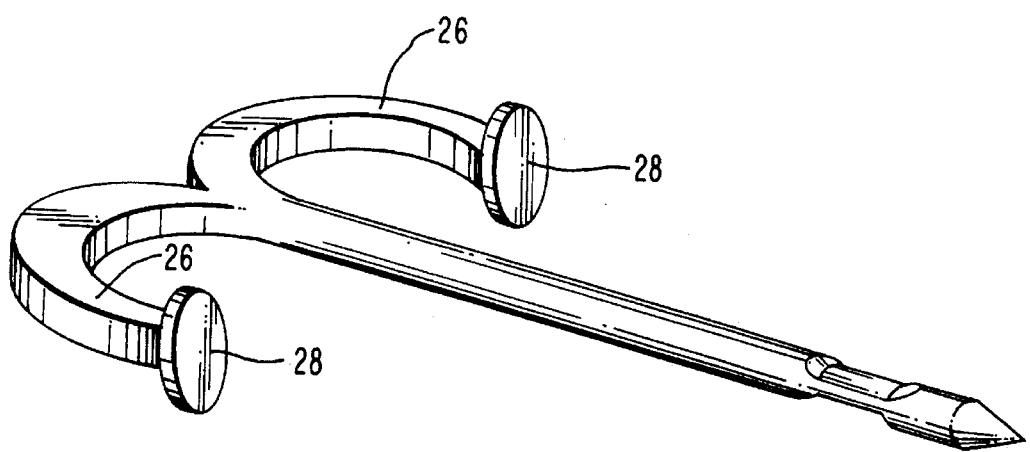
FIG. 2 is a perspective view of an alternative insulating connector.
Figure 3:
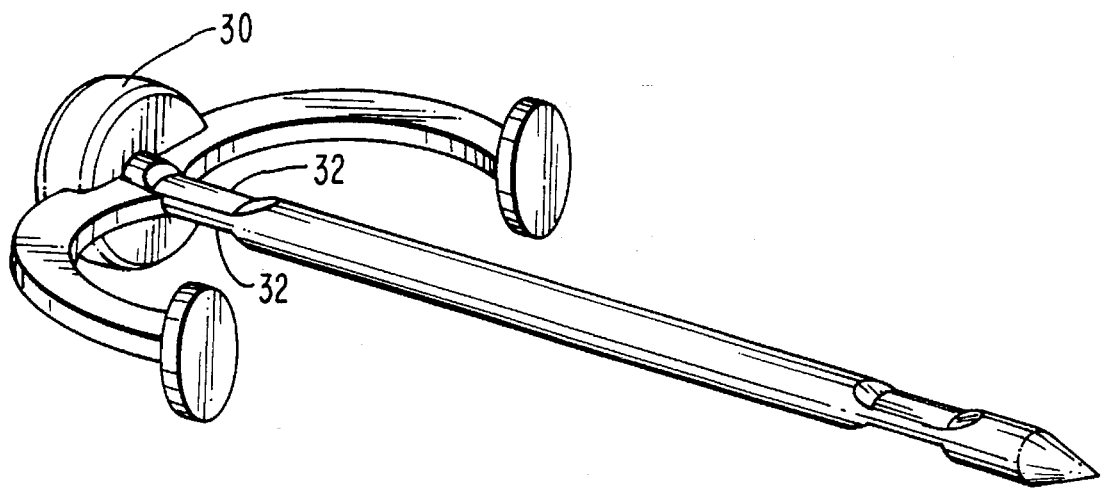
FIG. 3 is a perspective view of another alternative insulating connector.
Figure 4:
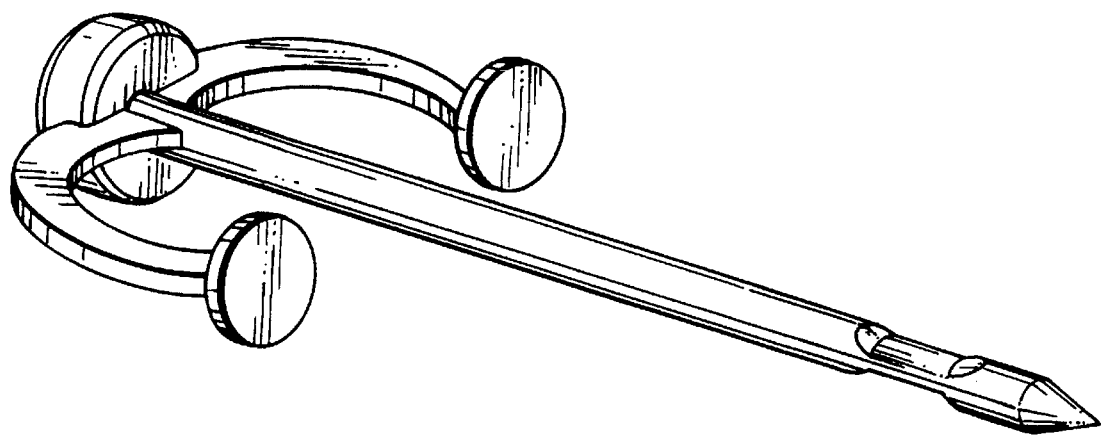
FIG. 4 is a perspective view of yet another alternative embodiment of a connector.
Figure 5:
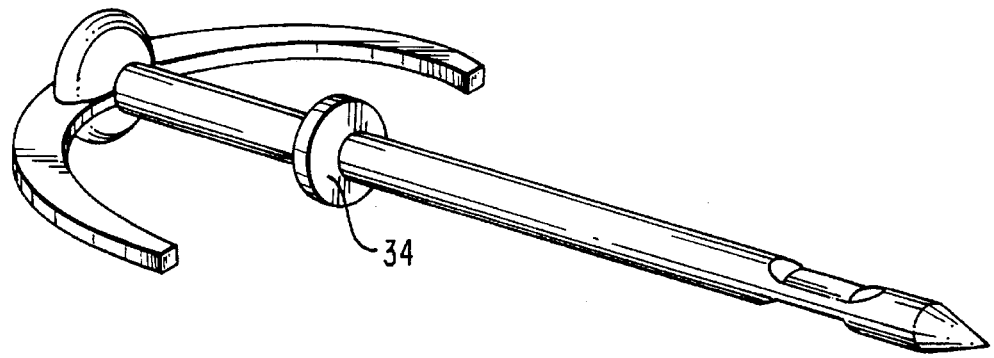
FIG. 5 is a perspective view of still another embodiment of a connector.

The connector of FIG. 3 is similar to the connector of FIG. 2, except that it also includes an enlarged head 30 similar to the enlarged head 30 contained in the connector of FIG. 1 for receiving an impact such as by a hammer or mallet. In addition, the gripping segment includes one or more recessed portions 32 into which plastic structural material can flow and then harden for more reliably anchoring the gripping segment 18 within the second structural layer. The connector of FIG. 4 is similar to the connector of FIG. 3, except that the flat ends 28 have the circular cross-section and the gripping segment 18 does not include any recessed portions. Finally, the connector of FIG. 5 is similar to the connector of FIG. 1, except that the connector of FIG. 5 includes a flange 34 for limiting penetration of the connector through the insulating layer and first structural layer rather than the flat ends 28 at the end of the arcuate wings 26 as in FIG. 1.

Figure 6A:
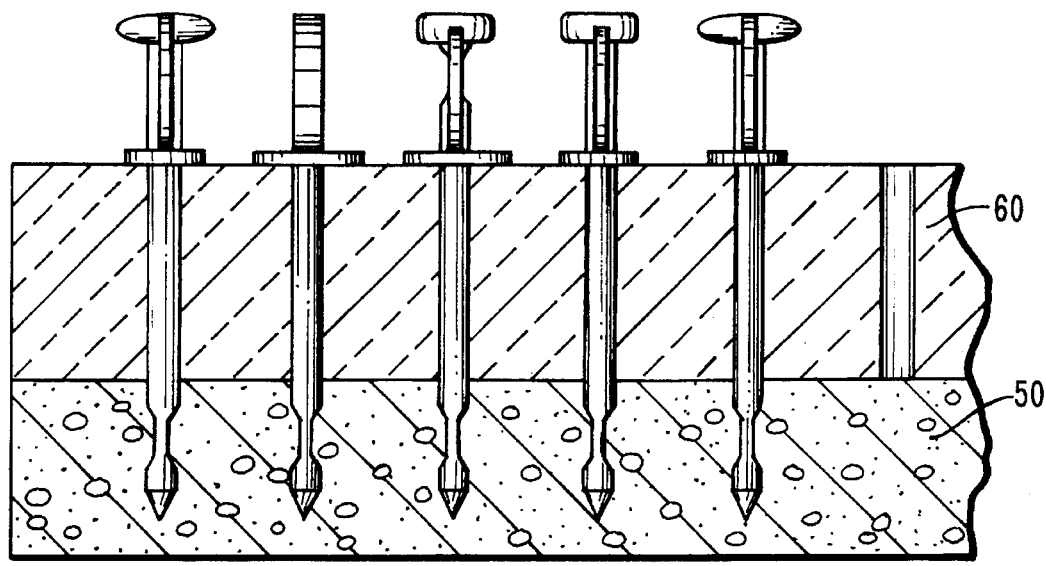
FIG. 6A is a cross-section view of a composite wall structure in the first stages of formation showing each of the connectors of FIGS. 1–5 protruding from the insulating layer.

Reference is now made to FIG. 6A, which shows each of the five exemplary connectors of FIGS. 1–5 placed within a sandwich structure comprising a first structural layer 50 and an insulating layer 60. Although FIG. 6A shows each of the five exemplary connectors in place, this is merely for illustrative purposes and in no way is intended to imply that different connectors having varying design features should be used, although one may wish to do so.

In a preferred method for manufacturing composite wall structures according to the present invention, a first layer of structural material is poured into an appropriate form. In general, the first structural layer 50 will be a generally flat rectangular slab, although it may also include other design, ornamental, or structural features. The only limitation is that it have a thickness or depth great enough to give the structural layer adequate strength and also the ability to firmly and reliably anchor the penetrating segment 14 of the connector 10 therewithin.

The first structural layer 50 may comprise any suitable material which can flow when initially cast and then harden to form a generally rigid structural layer. In a preferred embodiment, the first structural layer 50 comprises a concrete material including a hydraulic cement binder, water, an aggregate material, and other appropriate admixtures. Concrete is preferred because of its low cost, high strength, and ease of casting compared to other materials. Nevertheless, any appropriate structural material may be used, such as high strength polymers, resins or other materials, which can flow when cast and later be hardened.

The insulating layer 60 may comprise any appropriate insulating material, such as polystyrene foam, fiberglass, aerogel, xerogel, xonotlite, seagel, polyisocyanate foam, polyurethane foam, urea-formaldehyde foam, and low density, highly insulating cementitious materials. Such insulating materials are given only by way of example and not by limitation.

The insulating layer 60 preferably includes a plurality of holes that are predrilled or punched therethrough through which the connector rods of the present invention can be inserted, as described above. Because of the piercing effect of the penetrating tip 20, it is often preferable to drill holes having a smaller diameter compared to the diameter of the elongate shaft 12, particularly the mesial segment 16, to ensure a tight fit between the central shaft 12 of the connectors and the insulating layer. This helps to prevent incursion of concrete into the insulating layer, which can cause a thermal bridge and undermine the utility of the present invention. In many cases, no holes will be required at all because of the selftapping nature of the substantially pointed penetrating tip 20.

After casting the first structural layer 50 and while it is still in a plastic and deformable state such that it is neither hardened nor rigid to the point that the connectors 10 cannot be placed therein without damaging the structural integrity and strength of the structural layer 50, the insulating layer 60 is placed over the exposed surface of the first structural layer 50.

Thereafter, a plurality of connectors 10 are then inserted through each of the holes within the insulating layer 60 in a manner such that the penetrating segment 14 of the connectors penetrates through the insulating layer 60 and into the first structural layer 50 and so that the mesial segment 16 resides within the insulating layer 60. The generally flat ends 28 of the arcuate wings 26 act to limit penetration of the connector 10 through the insulation and first structural layers to a desired depth. Alternatively, the flange 34 acts to limit penetration of the connectors (FIG. 5). Once properly oriented, the penetrating segment 14 will substantially reside within the first structural layer 50, while the mesial segment 16 will substantially occupy a hole or space within the insulating layer 60. Because of the piercing effect of the penetrating tip 20, it may be possible to drill holes having a substantially smaller diameter compared to the diameter of the elongate shaft 12 of the connector 10. In some cases, no holes may be required at all.

Figure 6B:
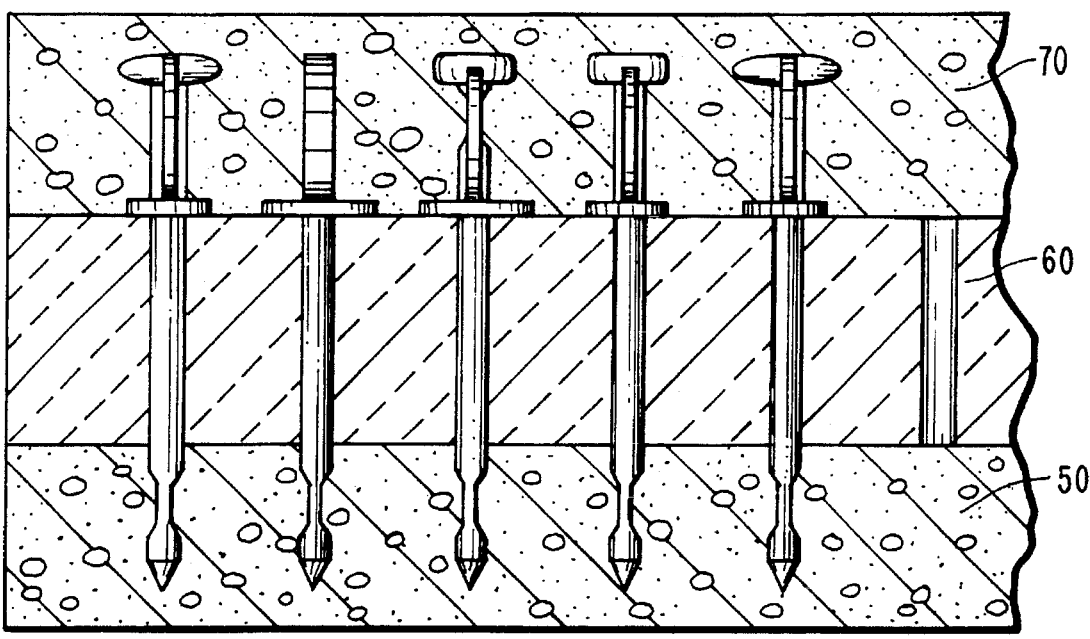
FIG. 6B is a cross-section view of the composite wall structure of FIG. 6A after the second structural layer has been cast over the insulation layer to envelope the connectors.

After the first structural layer 50 has achieved an adequate level of hardness or compressive strength, a second layer of structural material is poured over the surface of the insulating layer 60 to form the second structural layer 70, as shown in FIG. 6B. The second structural layer 70 may also comprise any appropriate material that will initially flow and then harden to form a substantially rigid structural wall. Concrete is preferred due to its low cost, high strength and ease of formation. Nevertheless, the second structural layer 70 may comprise a different material than the first structural layer 50 in order to achieve a synergistic effect of using two different materials, such as by using a plastic material that will be intended to reside within the interior of a building formed using the composite wall structures.

Although the second structural layer 70 will also generally be a rectangular slab, it may also include other design, structural, or ornamental features, depending on the intended use of the composite wall structure. The thickness or depth of the second structural layer 70 should be such that it completely, or at least substantially, envelopes the entire gripping segment 18, including the arcuate wings 26, in order to provide adequate anchoring of the gripping segment 18 within the second structural layer 70.

In some cases, it might be desirable to lay a second insulating layer over the yet unhardened second structural layer, followed by the insertion of additional connectors 10 through the second insulating layer and the yet unhardened second structural layer 70. Thereafter, a third structural layer (not shown) can be cast over the surface of the second insulating layer as before. Because of the simplicity of molding the connectors of the present invention, a connector specially adapted for multiple insulation layers could be molded that would connect all three structural layers together.

The various connector rods described herein were used in experimental composite wall structures and were found to have more than adequate shear strength to hold together the three layers of the composite wall structures that were tested. In fact, in all cases when a stress strong enough to cause a failure of the composite wall structure was applied, it was the concrete structural layer that failed in each instance. The connector rods were left intact. From the foregoing, the present invention provides improved insulating connectors and methods for manufacturing highly insulative composite wall structures.

In addition, the present invention provides improved insulating connectors in a single step that yet provide adequate strength and support in the manufacture of composite wall structures.

The present invention further provides improved connectors that can be molded in a single step and yet provide means for anchoring the connectors within the concrete layers while also providing means for positioning the connectors within the insulating layer during the formation of the composite wall structure.

Moreover, the present invention provides connectors that can be integrally molded in a single step without the need to mold an elongate connector shaft having means for retaining the shaft within the outer structural layers and a central sleeve portion having a flange and an large central diameter for positioning the connector within the insulating layer.

The present invention yet provides improved connectors having means for facilitating their penetration through an insulating layer in a first of two structural layers during the formation of a composite wall structure, particularly using the tilted method.

Finally, the present invention provides improved connectors having means for receiving an impact, such as from a hammer or mallet and/or features which aid in gripping the connector in order to facilitate penetration of the connectors through the insulating layer and the first structural layer.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to embraced within their scope.

What is claimed and desired to be secured by United States Letters Patent is:

1. A connector used in making an insulating composite wall structure including first and second structural layers comprising a hardenable material and an insulating layer disposed between the first and second structural layers, wherein the connector comprises a highly insulating material and includes:
   (a) an elongate shaft having a penetrating segment, a gripping segment, and a mesial segment disposed between the penetrating and gripping segments, the elongate shaft having a width;
   (b) a penetrating tip at an end of the penetrating segment distal to the mesial segment, the penetrating tip having a width that is less than the width of the elongate shaft;
   (c) orienting means for limiting penetration of the elongate shaft through the insulating layer;
   (d) first anchoring means within the penetrating segment for anchoring the connector within the first structural layer when substantially hardened; and
   (e) second anchoring means within the gripping segment comprising a plurality of acurate wings laterally disposed on the enlongate shaft for anchoring the connector within the second structural layer when substantially hardened.

2. A connector as defined in claim 1, wherein the orienting means includes a flange integrally molded within the connector at or near where the gripping segment and the mesial segment intersect.

3. A connector as defined in claim 1, wherein the orienting means includes flat ends disposed at an end of each of the plurality of arcuate wings distal to where the arcuate wings emanate from the elongate shaft.

4. A connector as defined in claim 1, wherein the first anchoring means within the penetrating segment comprises at least one recess in the penetrating segment disposed between the penetrating tip and the mesial segment.

5. A connector as defined in claim 1, wherein the second anchoring means within the gripping segment further comprise at least one recess.

6. A connector as defined in claim 1, wherein the connector is formed from a thermoplastic resin selected from the group consisting of polyamide, polyarylsulfone, polycarbonate, polyphthalamide, and polysulfone.

7. A connector as defined in claim 1, wherein the connector is formed from a thermoplastic resin selected from the group consisting of acrylics, acrylonitrile-butadienestyrene copolymer, fluorocarbons, polybutadiene, polybutylene teraphthalate, polyesters, polyethylene teraphthalate, polyphenylene ether, polyphenylene oxide, polyphenylene sulfide, polyphthalate carbonate, polypropylene, polystyrene, polyurethane, polyvinyl chloride, and polyxylene.

8. A connector as defined in claim 1, wherein the connector is formed from a thermoset resin selected from the group consisting of polyester, vinyl ester, diallyl phthalate, epoxy resins, furan resins, and phenolic resins.

9. A connector as defined in claim 1, wherein the connector is formed from a thermoplastic alloy selected from the group consisting of PPO/Nylon, ABS/PC, PBT/PET, PC/PBT, PC/PET, and PS/PC.

10. A connector rod as defined in claim 1, wherein the connector rod is impregnated with fibers selected from the group consisting of glass fibers, graphite fibers, boron fibers, ceramic fibers, and mixtures thereof.

11. A connector rod as defined in claim 1, wherein the connector is molded in a single step.

12. A connector as defined in claim 1, wherein the gripping segment terminates in an enlarged area at an end distal to where the gripping segment and the mesial segment intersect.

13. A connector as defined in claim 1, where the connector includes two arcuate wings.

14. A highly insulating composite wall structure including first and second structural layers comprising a hardenable material and an insulating layer disposed between the first and second structural layers, wherein the connector comprises a highly insulating material and includes:
   (a) an elongate shaft having a penetrating segment, a gripping segment, and a mesial segment disposed between the penetrating and gripping segments, the elongate shaft having a width;
   (b) a penetrating tip at an end of the penetrating segment distal to mesial segment, the penetrating tip having a width that is less than the width of the elongate shaft;
   (c) two arcuate wings laterally disposed at an end of the gripping segment distal to the mesial segment, the arcuate wings providing means for anchoring the connector within the second structural layer when substantially hardened;
   (d) orienting means for limiting penetration of the elongate shaft through the insulating layer to a desired depth, the orienting means comprising enlarged ends disposed at ends of the arcuate wings distal to where the arcuate wings emanate from the elongate shaft; and
   (e) at least one recess in the penetrating segment of the elongate shaft disposed between the penetrating tip and the mesial segment for anchoring the connector within the first structural layer when substantially hardened.

15. A connector as defined in claim 14, wherein the gripping segment terminates in an enlarged area at an end distal to where the gripping segment and the mesial segment intersect.

16. A highly insulating composite wall structure comprising a first structural layer including a hardenable structural material, a second structural layer including a hardenable structural material, and an insulating layer disposed between the first and second structural layers, the first structural layer, the second structural layer and the insulating layer being secured together by means of a plurality of connectors comprising an insulating material and including:

(a) an elongate shaft having a penetrating segment, a gripping segment, and a mesial segment disposed between the penetrating and gripping segments, the elongate shaft having a width;

(b) a penetrating tip at an end of the penetrating segment distal to the mesial segment the penetrating tip having a width that is lest than the width of the elongate shaft;

(c) orienting means for limiting penetration of the elongate shaft through the insulating layer;

(d) first anchoring means within the penetrating segment for anchoring the connector within the first structural layer when substantially hardened; and (e) second anchoring means within the gripping segment comprising a plurality of acuate wings laterally disposed on the enlongate shaft for anchoring the connector within the second structural layer when substantially hardened.

17. A highly insulating composite wall structure as defined in claim 16, wherein at least one of said first and second structural layers comprises a concrete material.

18. A highly insulating composite wall structure as defined in claim 16, wherein the insulating layer comprises polystyrene foam.

19. A highly insulating composite wall structure as defined in claim 16, wherein the insulating layer comprises fiberglass.

20. A highly insulating composite wall structure as defined in claim 17, wherein the composite wall structure is manufactured by the process comprising the steps of:

(a) forming a first layer of hardenable material while in a plastic and flowable state;

(b) placing the insulating layer over the first layer of structural material while in the plastic and flowable state;

(c) inserting a plurality of the connectors through the insulating layer and first layer of unhardened structural material such that the penetrating segment is substantially disposed within the first structural layer, such that the mesial segment is substantially disposed within the insulating layer, and such that the gripping segment is substantially exposed through a surface of the insulating layer; and (d) casting a second layer of structural material onto the surface of the insulating layer in order to form the second structural layer, the second structural layer having a thickness such that the gripping segment of each of the connectors is substantially enveloped within the second structural layer.

\* \* \* \* \*

UNITED STATES PATENT AND TRADEMARK OFFICE
CERTIFICATE OF CORRECTION

PATENT NO. : 5,606,832
DATED : March 4, 1997
INVENTOR(S) : David O. Keith & David M. Hansen It is certified that error appears in the above-indentified patent and that said Letters Patent is hereby corrected as shown below:

At col. 4, line 26, begin a new paragraph before "Such improved".

At col. 8, line 42, change "o connector" to --connector--.

At col. 10, line 25, begin a new paragraph before "The end".

At col. 12, line 54, begin a new paragraph before "From the".

At col. 15, line 9, delete "lest" and insert therefor --less--.

Signed and Sealed this

Nineteenth Day of August, 1997

*Attest:*

BRUCE LEHMAN

*Attesting Officer*     Commissioner of Patents and Trademarks